R. W. BOSWELL.
SHOCK ABSORBER.
APPLICATION FILED OCT. 29, 1919. RENEWED JAN. 26, 1922.
1,409,819.
Patented Mar. 14, 1922.
2 SHEETS—SHEET 1.
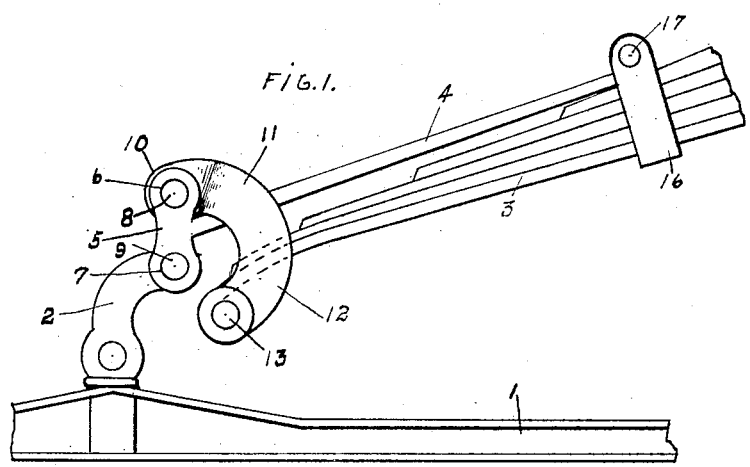
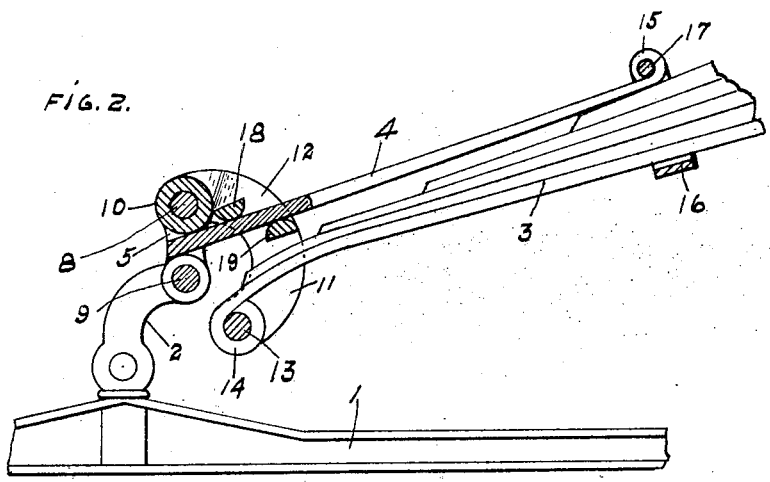
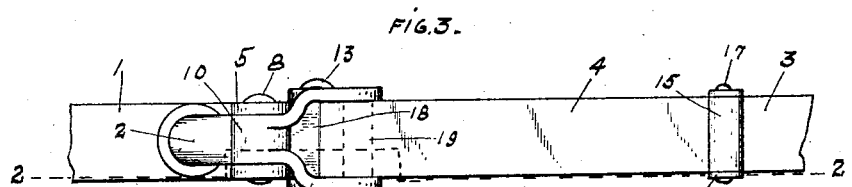
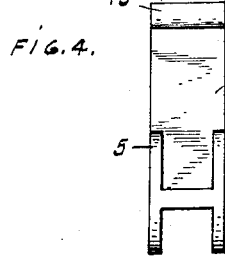 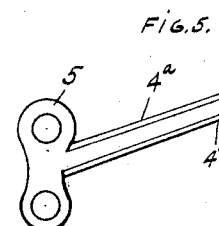
INVENTOR.
RALPH W. BOSWELL
BY Carey S. Frye
ATTORNEY.

R. W. BOSWELL.
SHOCK ABSORBER.
APPLICATION FILED OCT. 29, 1919. RENEWED JAN. 26, 1922.
1,409,819.
Patented Mar. 14, 1922.
2 SHEETS—SHEET 2.
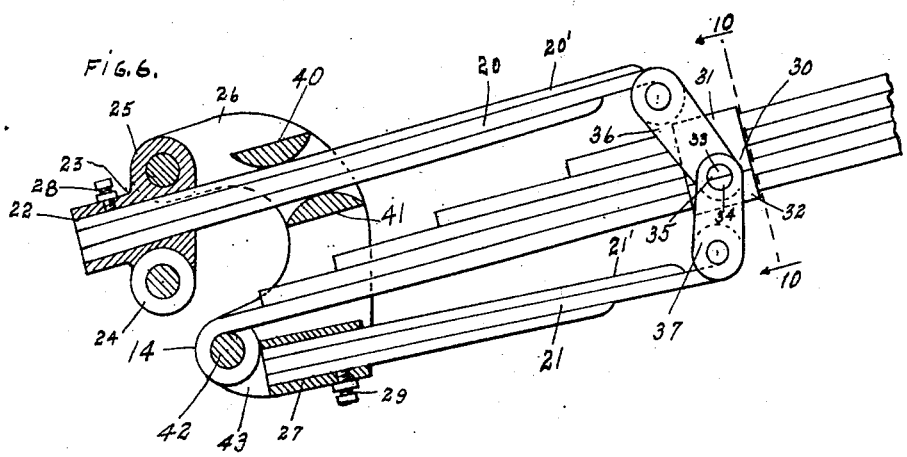
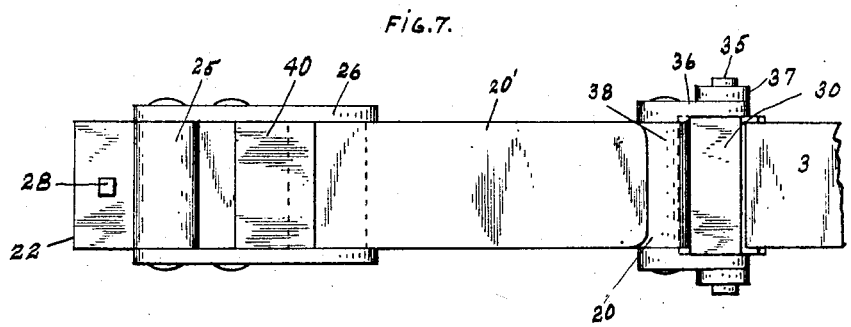
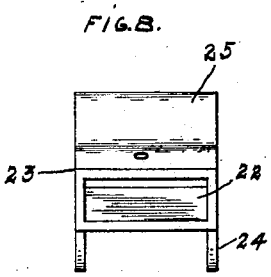 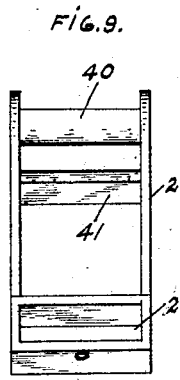 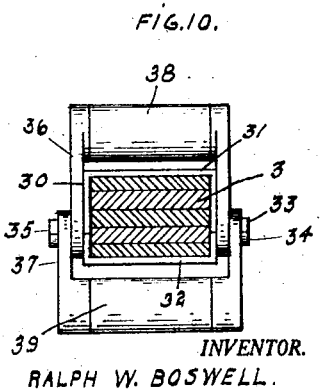
INVENTOR.
RALPH W. BOSWELL.
BY Carey S. Frye
ATTORNEY.

UNITED STATES PATENT OFFICE.

RALPH W. BOSWELL, OF INDIANAPOLIS, INDIANA.

SHOCK ABSORBER.

1,409,819. Specification of Letters Patent. Patented Mar. 14, 1922.

Application filed October 29, 1919, Serial No. 334,266. Renewed January 26, 1922. Serial No. 532,040.

*To all whom it may concern:*

Be it known that I, RALPH W. BOSWELL, a citizen of the United States, residing at Indianapolis, county of Marion, State of Indiana, have invented certain new and useful Improvements in Shock Absorbers, of which the following is a specification.

This invention relates to shock absorbers and particularly to that class adapted for use in connection with automobiles of the Ford type, the prime feature of the invention being the provision of a shock absorber that may be attached to the parts of the automobile without changing the position of any of the parts thereof and one wherein the ends of the body springs will be suspended in the same relative positions with the perch hangers as when the ordinary structurue is used for suspending the springs.

A further feature of the invention is the provision of a shock absorber that will practically eliminate the action created by the rebound as well as that caused by the impact.

A further feature of the invention is the provision of a structure that can be cheaply manufactured and readily and easily applied to use and at the same time produce a strong and durable structure.

Other objects and advantages will be hereinafter more fully set forth and pointed out in the accompanying specification.

In the accompanying drawings which are made a part of this application,

Figure 1 is a side elevation of a portion of the front axle and body spring of the Ford type, showing the shock absorber attached thereto.

Fig. 2 is a sectional view as seen on line 2—2, Fig. 3.

Fig. 3 is a top plan view of the structure shown in Fig. 1.

Fig. 4 is an end elevation of the pivotal end of the shock absorbing spring.

Fig. 5 is a side elevation of a slightly modified form of shock absorbing spring.

Fig. 6 is a side elevation, partly in section, of a further modified structure.

Fig. 7 is a top plan view of that structure shown in Fig. 6.

Fig. 8 is an end elevation of the form of pivot head shown in Fig. 6.

Fig. 9 is an edge elevation of that form of shackle shown in Fig. 6.

Fig. 10 is a sectional view as seen on line 10—10 Fig. 6.

Referring to the drawings in which similar reference numerals designate corresponding parts throughout the several views, 1 indicates an axle, 2 indicates a perch hanger carried by the axle and 3 indicates a body spring, these parts being of the class used in connection with Ford cars.

In order to suspend the body spring 3 from the perch hanger 2 so as to practically eliminate and absorb jar incident to an impact and also to eliminate undue rebound of the body spring, a shock absorbing spring 4, preferably of the leaf variety, is positioned between the perch hanger and the body spring, one end of the spring having a pair of plates 5 attached to the edges thereof and having their ends projecting above and below the spring, said plates being preferably integral with the spring 4.

The upper and lower ends of the plates 5 have registering openings 6 and 7 respectively, through which pass bolts 8 and 9 respectively, the bolt 8 passing through a sleeve 10 of a shackle 11, while the bolt 9 passes through the pivot end of the perch hanger 2 and pivots the shock absorbing spring 4 thereto.

The ends of the plates 5 through which the bolt 8 passes are so positioned that the bolt 8 normally rests in a vertical line above the bolt 9 and in order to suspend the end of the body spring 3 from the shackle 11, one end of the shackle is bifurcated to form arms 12, which arms are bowed outwardly to pass by the edges of the spring 4, and said arms are curved downwardly to a point below the shock absorbing spring 4, as the end of the body spring is positioned below the shock absorbing spring. The end of the body spring 3 is secured between the free ends of the arms 12 by passing a pivot bolt 13 through openings in the arms and through the eye 14 of the body spring, the shackle being so constructed that the end of the body spring will be suspended the same distance from and have the same relative movement around the pivot end of the perch hanger as when suspended in the usual manner.

The shock absorbing spring 4 extends parallel with and in a plane above the body spring 3, and the inner end of the spring 4 may be rested directly upon the body spring 3 or supported over the spring 3 in any suitable manner. Preferably, however, the inner end of the spring 4 is provided with an eye 15, which registers with openings in the end of a clip 16, said clip extending around the body spring and being secured to the spring 4 by extending a bolt 17 through the openings in the clip and the eye 15 of the shock absorber spring.

Extending transversely across the shackle 11 and having their ends attached to the arms 12 of the shackle, are bars 18 and 19, which are preferably semi-circular, the bar 18 being above the shock absorbing spring 4 and the bar 19 below the spring 4, the rounded sides of the bars engaging the faces of the shock absorbing spring.

By arranging the bars in this manner, any end thrust directed against the body spring 3 will be taken up by the shock absorbing spring 4 as the outward swinging movement of the body spring will cause the bar 18 to direct pressure on the shock absorbing spring, while the inward movement of the opposite end of the spring 3 will cause the bar 19 at that end of the body spring to direct upward pressure against the shock absorbing spring cooperating therewith, consequently the end thrust of the body spring and likewise the side sway of the vehicle body will be eliminated.

In addition to directing pressure against the spring 4, due to the side sway of the body spring 3, the bar 18 will direct downward pressure against the shock absorbing spring 4, when downward movement of the body spring 3 takes place, either due to weight being placed in the body of the vehicle or to the wheel of the vehicle receiving an impact, such weight or shock caused by the impact being practically entirely taken up and absorbed by the shock absorber spring 4 before it is imparted to the body spring, and likewise, the bar 19 will direct upward pressure against the shock absorbing spring 4 in case of a rebound of the body spring 3, thus eliminating all shock from the body spring due to rebound.

By pivoting the shackle 11 to the plates 5 at a point directly above the pivot end of the perch hanger, an end thrust on the body spring will cause the shackle to pivot on the bolt 8 without materially effecting or causing pivot action of the plates on the bolt 9, the end of the body spring swinging substantially in an arc of a circle around the pivot end of the perch hanger, as is usual. When the body spring 3 is given a downward movement from any cause, the plates 5 pivot on both the bolts 8 and 9, so that such movement is first directed solely against the shock absorbing spring 4, the pivotal movement on the bolt 9 compensating for the downward movement of the body spring and the pivotal movement on the bolt 8 compensating for the lengthwise movement of the body spring.

The shock absorbing spring is preferably constructed of a single leaf, but as shown in Fig. 5 of the drawings, it may be constructed of a number of leaves and by forming these leaves detachable, they may be added or removed as occasion may require, the auxiliary leaves 4ª being secured in position in any suitable manner, and preferably an equal number on each side of the main leaf 4, as pressure is directed against the shock absorbing spring from both directions.

In that form of device shown in Figs. 6 to 10 inclusive, two shock absorbing springs are used, the spring 20 being above the body spring 3 and the spring 21 below the body spring 3 and these shock absorbing springs may be reinforced by auxiliary leaves 20' and 21', respectively, if so desired.

In this form of device the end of the upper spring 20 and the leaves accompanying the same enter a socket 22 in a pivot head 23, said pivot head having ears 24 depending therefrom which cooperate with the perch hanger 2 for pivotally attaching the head 23 to the perch hanger, while the upper end of the pivot head has a pivot sleeve 25 thereon to which the shackle 26 is pivoted, the pivot point of the shackle 26 being vertically above the pivot point between the ears 24 and the perch 2.

The lower end of the shackle 26 is provided with a socket 27 in which the ends of the shock absorber spring 21 and its reinforcing leaves 21' are secured, said springs 20 and 21 and their associated leaves being secured in their respective sockets in any preferred manner, as by means of lock bolts 28 and 29.

The opposite ends of the shock absorber springs are pivoted to a sleeve 30, mounted upon the body spring 3, said sleeve being preferably made of companion channel sections 31 and 32, the meeting ends of the sections having semi-circular projections 33 and 34 thereon which, when the sections are positioned around the body spring, form trunnions 35, which serve as pivot points for the inner ends of links 36 and 37.

The opposite ends of the links 36 and 37 are pivoted respectively, to the eyes 38 and 39 of the springs 20 and 21, and said eyes are so located that an outward thrust will be given to the inner ends of the shock absorber springs incident to an endwise movement of the body spring and likewise permit free action of the shock absorber springs when receiving shock from the action of the body spring.

The shackle 26 is also provided with cross bars 40 and 41, one above and one below the spring 20, which are constructed similar to and perform the same function as the cross bars 18 and 19, and while not so shown, similar cross bars may be utilized in connection with the spring 21. The end of the body spring 3 is connected with the shackle by extending a pivot bolt 42 through ears 43 on the shackle and through the eye 14 on the end of the body spring, thus suspending the body spring in substantially the same position as when the body spring is suspended in the ordinary manner, the end of the body spring moving around the pivot end of the perch hanger in substantially an arc of a circle during an end thrust of the body spring.

It will be understood that the shock absorber springs may consist of a single leaf instead of a number of leaves as shown and that by properly arranging the shackle, the upper shock absorber spring may be dispensed with. Likewise, the lower shock absorber spring may be dispensed with, in which event the structure will be substantially the same as that shown in Fig. 1.

The invention claimed is:

1. A shock absorber including a body spring, a perch hanger, a flat elongated shock absorber spring, a shackle connecting said body spring to the shock absorber spring and means on the shackle above and below the shock absorbing spring for causing the shock absorber spring to resist movement of the body spring in any direction.

2. A shock absorber including a body spring, a perch hanger, a flat elongated shock absorber spring, means for pivoting the shock absorber spring to the perch hanger at a point below the shock absorber spring, a shackle, means for pivoting the shackle to the shock absorber spring at a point above the shock absorber spring, means for pivotally attaching the shackle to the body spring at a point below the shock absorber spring, and means on the shackle for causing the shock absorber spring to resist the movement of said body spring in all directions.

3. A shock absorber including a body spring, a flat elongated shock absorber spring above the end of the body spring, a pair of plates at the outer end of the shock absorber spring, and at each edge thereof, and extending above and below said shock absorber spring, said plates normally extending vertical, a perch hanger pivoted between the lower ends of said plates, a shackle pivoted at one end between the upper ends of said plates and over the shock absorbing spring and vertically over the pivot end of the perch hanger, means for pivotally attaching the end of the body spring to the lower end of the shackle below the shock absorber spring, and means on the shackle engaging faces of the shock absorbing spring for causing the shock absorber spring to resist the movement of said body spring in any direction.

4. A shock absorber including a body spring, a shock absorber spring lying in a plane above the end of the body spring and having one end resting on the body spring, a shackle pivotally connecting the opposite end of the shock absorber spring to the end of the body spring, and cross bars carried by said shackle, one above and one below said shock absorber spring, the upper bar causing the shock absorber spring to resist downward and endwise movement of the body spring and the lower bar resist upward movement of the body spring.

5. In a shock absorber, a pivot head having a pivot-point at its upper and lower ends, a flat elongated shock absorber spring carried by said head, a shackle pivoted to the upper end of the pivot head, and an additional shock absorber spring attached to said shackle and extending in a plane with and a distance below the first spring.

6. In a shock absorber a head having pivot points at its upper and lower ends, one vertically above the other, a shackle pivoted at one end to the upper pivot point of the head and having its opposite end curved downwardly and below the lower pivot point of the head, a body spring having its end pivoted to the lower end of the shackle, and a shock absorber spring carried by the shackle below the body spring.

In testimony whereof I hereunto affix my signature.

RALPH W. BOSWELL.